United States Patent Office 3,111,377
Patented Nov. 19, 1963

3,111,377
TREATMENT OF SULFITE SPENT LIQUOR
Jarrell B. Mugg, Vancouver, Wash., assignor to Crown Zellerbach Corporation, San Francisco, Calif., a corporation of Nevada
No Drawing. Filed Feb. 27, 1961, Ser. No. 91,572
15 Claims. (Cl. 23—48)

This invention relates to a process for treating sulfite spent liquors containing an alkali metal salt as a cation. More particularly, the present invention relates to a process for the recovery of chemicals from a sulfite spent liquor containing sodium as a base, which liquor is obtained from the digestion of a lignocellulosic plant material by the sulfite pulping process.

In the sulfite process for pulping lignocellulosic plant materials, such as wood or agricultural residues, the lignocellulosic plant material in the form of small pieces is cooked under pressure with an aqueous liquor containing a sulfite or a bisulfite and frequently sulfurous acid. The principal alkali metal employed as a cation in the sulfite pulping processes is sodium. Accordingly, such processes are termed the sodium-base acid sulfite process or neutral sulfite process, depending upon the composition and the pH of the cooking liquor employed.

During the digestion of lignocellulosic material, the cooking liquor reacts preferentially with the lignin and after the digestion of the lignocellulosic material is completed, the liquor is separated from the cellulosic pulp. The separated liquor is known in the art as sulfite spent liquor. It contains an aqueous solution of lignin compounds, wood sugars and inorganic chemicals. While many attempts have been made to provide an economical process for the recovery of chemicals from sodium-base sulfite spent liquors, such attempts have not been entirely successful on a commercial scale. For example, in one of the proposed processes for the recovery of sodium-base sulfite spent liquor, the inorganic smelt obtained in the burning of the spent liquor is dissolved in water. The resulting solution containing sodium and sulfur compounds is carbonated. During the carbonization, a gaseous mixture containing a substantial proportion of hydrogen sulfide is produced. The hydrogen sulfide is then separated from the gaseous mixture and converted to sulfur in a special catalytic reactor system. However, in this procedure, a special equipment for handling hydrogen sulfide is necessary and difficulties have been encountered in achieving a complete conversion of hydrogen sulfide to sulfur.

The present invention relates to the general problem of utilization of alkali metal-base sulfite spent liquors and has for its general object the provision of a process wherein the inorganic portion of such liquors may be converted easily and economically into useful inorganic chemicals having a wide variety of commercial applications.

It is another object of this invention, to provide an improved process for treating an alkali metal-base sulfite spent liquor wherein the formation of hydrogen sulfide as an intermediate gas product is eliminated, thus obviating the drawback referred to hereinabove.

It is still another object of the present invention to provide a continuous cyclic process for the recovery of valuable inorganic chemicals from alkali metal-base sulfite spent liquor, particularly sodium-base sulfite spent liquors, wherein the recovered chemicals can be combined to produce fresh sulfite cooking liquor for reuse in the pulping process.

Other objects and advantages of the present process will become apparent as the invention is hereinafter more fully described.

Broadly stated, this invention comprises the process wherein a sulfite spent liquor of the type described hereinabove is first concentrated then incinerated at an elevated temperature thereby releasing volatile products resulting from the combustion of the organic portion of the liquor and producing a non-combustible inorganic residue. The resulting residue comprising an alkali metal sulfide is then reacted with a hot carbon dioxide-containing gas at an elevated temperature to produce elemental sulfur and a corresponding alkali metal carbonate. The elemental sulfur thus produced may then be readily separated from the alkali metal carbonate.

When the resulting chemicals, i.e. sulfur and the alkali metal carbonate, are to be employed in the preparation of fresh sulfite cooking liquor, the alkali metal carbonate is mixed with water to produce a carbonate solution, while the elemental sulfur is burned in the presence of a free oxygen-containing gas to form sulfur dioxide, which subsequently is mixed with the carbonate solution thereby forming fresh sulfite cooking liquor for reuse in the pulping process.

Although the present process is applicable to sulfite spent liquors containing an alkali metal base, such as sodium, potassium or lithium, it will now be described in greater detail in connection with a sodium-base sulfite spent liquor as a starting material.

The term "sulfite spent liquor" used herein denotes the spent liquors obtained from the chemical pulping of various lignocellulosic plant materials by the conventional acid sulfite, bisulfite or neutral sulfite processes in which aqueous solutions of alkali metal sulfites or bisulfites are employed. After the spent liquor is separated from the cellulosic pulp produced, it usually has a solids content of about 10%. In accordance with the present invention, the spent liquor is first concentrated in conventional evaporators to a solids content of about 40 to 60%, then directed to a suitable incinerating zone in which the remaining portion of water is driven off and the resulting dry solids are incinerated at a temperature in excess of 1600° F., generally in the range of from 1800° F. to 2200° F. for a time sufficient to burn the combustible organic portion of such solids. The volatile combustion products comprising sulfur dioxide as well as water vapor, nitrogen, and carbon dioxide are released from the incinerating zone and cooled in any suitable apparatus to a temperature ranging between about 100° F. and 700° F.

The cooled gases are then introduced into a vessel containing an aqueous solution of sodium carbonate, wherein sulfur dioxide is absorbed, while the remaining portion of non-condensible volatile products is released.

If desired, the concentrated spent liquor may first be dried to a solids content of approximately 90–95% and then introduced into the incinerating zone.

The resulting molten inorganic residue containing a mixture of sodium sulfide and sodium carbonate is cooled in any suitable cooling apparatus to a temperature below 1530° F. whereby the residue is solidified. The solidified residue is crushed or otherwise comminuted to a suitable fine particle size and directed to a desulfurizing zone where it is reacted at an elevated temperature with hot carbon dioxide-containing gas for a time sufficient to produce elemental sulfur and sodium carbonate. The resulting elemental sulfur obtained in vapor form may easily and conveniently be separated from the sodium carbonate. The sodium sulfide-containing inorganic residue may conveniently be formed into a bed in the desulfurizing zone where it may be fluidized with the carbon dioxide-containing gas. The temperature of the reaction in the desulfurizing zone may vary to a certain extent, but in general it should be not less than about 700° F., and preferably it should range between about 1100° F. and 1530° F. The carbon dioxide-containing gas which is introduced into the desulfurizing zone may be produced by burning a suitable carbonaceous fuel having a high carbon to hydrogen ratio, such as fuel oil, powdered coke, etc. in the presence of free oxygen-containing gas. The carbon dioxide-containing gas produced in this manner should preferably contain at least 15% $CO_2$ by volume.

It will be understood that the flow rate of the carbon dioxide-containing gas introduced into the desulfurizing zone may vary depending upon the design of the apparatus in which the inorganic residue is reacted with $CO_2$. However, the amount of carbon dioxide introduced should be sufficient to convert substantially all of the sodium sulfide into sodium carbonate. In general, a flow rate of the carbon dioxide-containing gas of approximately 20 to 50 standard cubic feet per minute per square foot of bed area, should be satisfactory. During the desulfurizing step, a gaseous mixture containing vaporized elemental sulfur is released and cooled in a suitable condensing apparatus to a temperature below about 800° F. in order to condense the elemental sulfur which is thereafter separated by any suitable means from the non-condensible gases comprising carbon dioxide, carbon monoxide, and nitrogen. The condensed sulfur may be solidified, if desired, in accordance with conventional practice.

The elemental sulfur and the sodium carbonate produced in accordance with the process of this invention may be employed in many known industrial applications. Thus, sodium carbonate is useful in the manufacture of soaps, in water softening, in processing of textiles, etc. Elemental sulfur is useful in the production of sulfuric acid, as a vulcanizing agent for rubber, etc.

However, when a recovery of inorganic chemicals in a sulfite pulp mill is contemplated, sodium carbonate discharged from the desulfurizing zone may be admixed with water to form a carbonate solution and the condensed elemental sulfur may be burned in the presence of a free oxygen-containing gas, such as air, to produce sulfur dioxide gas. The sulfur dioxide gas discharged from the burner at a temperature of usually about 1500° F. is cooled rapidly to below about 700° F. and admixed with the sodium carbonate solution to produce fresh cooking liquor for reuse in the pulping of a new quality of lignocellulose. It should be noted that the respective proportions of the sulfur dioxide and the sodium carbonate may be adjusted depending upon the desired composition and the pH of the fresh sulfite cooking liquor to be used in the pulping process.

In order to disclose the nature of the present invention more clearly, the following illustrative example is given hereinbelow.

*Example*

This example illustrates the presently described continuous cyclic process for the recovery of inorganic chemicals from sodium-base sulfite spent liquor.

The spent liquor obtained from pulping western hemlock by sodium-base acid sulfite process and having a solids concentration of about 12% is concentrated to 55% solids content by weight in multiple effect evaporators and sprayed into a kraft-type recovery furnace in which the organic constituents of the liquor are burned, thereby producing a molten inorganic smelt, sulfur dioxide-containing volatile products and heat. The resulting hot volatile products containing about 1% $SO_2$ by volume pass through a boiler section of the furnace in which they are cooled to about 300° F. and the heat is recovered as steam. The cooled volatile products are passed through three primary absorption towers containing sodium carbonate solution in which sulfur dioxide is absorbed to form weak cooking liquor, while the noncondensible gases are released. The resulting weak cooking liquor is then pumped to a secondary absorption tower where additional sulfur dioxide produced in a sulfur burner is added and absorbed to produce fresh cooking liquor for reuse in the pulping operations.

The inorganic residue of the spent liquor falls into the reducing zone in the bottom of the furnace where the sulfur compounds present are reduced to sodium sulfide. Molten smelt containing sodium sulfide and sodium carbonate in a molar ratio of about 1:1 is tapped from the furnace continuously and cooled to about 1400° F. in a steam-heated drum wherein it is solidified and broken up. It is then comminuted by crushing rolls to small particles passing through a 10-mesh Tyler screen, and fed to a fluidized bed desulfurizing zone maintained at a temperature of 1400° F. by means of carbon dioxide-containing gas which provides the heat and carbon dioxide needed to effect the desulfurization. When the sodium sulfide reacts with carbon dioxide, a gaseous mixture containing vaporized elemental sulfur and a residue of sodium carbonate is formed. The carbon dioxide-containing gas which contains about 16% $CO_2$ by volume is produced by burning powdered coke in the presence of substantially dry air in a burner located beneath the desulfurizing zone. The hot $CO_2$-containing gas passes through the reaction bed at a rate of 45 standard cubic feet per minute per square foot of bed area.

The gaseous mixture leaving the desulfurizing zone contains about 5% elemental sulfur vapor by volume. This mixture is cooled to 300° F. in a condenser to liquefy sulfur. The liquefied sulfur thus obtained is drained from the bottom of the condenser and pumped to the sulfur burner previously mentioned, while the non-condensible gases are exhausted. The residual sodium carbonate is discharged from the desulfurizing zone and dissolved in water. About a half of the resulting sodium carbonate solution is pumped to the primary absorption tower previously mentioned for absorbing sulfur dioxide from the volatile products released from the furnace. The other half of the carbonate solution is pumped to the secondary absorption tower in which it is mixed with the weak cooking liquor prepared in the primary towers to produce fresh cooking liquor.

While the invention has been illustrated by way of the foregoing example in connection with sodium-base sulfite spent liquor, other alkali metals, such as potassium or lithium, may be employed as a cation in the sulfite liquor.

Accordingly, it will be apparent that by the present invention I have provided an improved process for treating sulfite spent liquor to produce elemental sulfur and an alkali metal carbonate. Also, the process of this invention may be effectuated as a continuous cyclic process in a sulfite pulp mill wherein the inorganic chemicals are substantially completely recovered to produce fresh sulfite cooking liquor for reuse in pulping operations. The process may be carried out easily and economically on a large commercial scale. It thus provides a practical means of converting an alkali metal base sulfite spent liquor to commercially useful products.

It will be understood by those skilled in the art that reasonable variations and modifications are possible within the scope of the foregoing disclosure and the appended claims.

I claim:
1. The process of treating sulfite spent liquor obtained from the digestion of a lignocellulosic plant material with a cooking liquor containing an alkali metal salt selected from the group consisting of sulfites and bisulfites which comprises the steps of: (1) concentrating said spent liquor, (2) incinerating the resulting concentrated liquor to release volatile products therefrom and to produce a solid inorganic residue, (3) reacting said solid residue with hot carbon dioxide-containing gas at an elevated temperature to produce elemental sulfur and a corresponding alkali metal carbonate, and (4) separating said elemental sulfur from said alkali metal carbonate.

2. The process of claim 1 wherein said alkali metal is sodium.

3. The process of claim 1 wherein said alkali metal salt is sodium sulfite.

4. The process of claim 1 wherein said alkali metal salt is sodium bisulfite.

5. The process of claim 1 wherein said inorganic residue comprises the corresponding alkali metal sulfide.

6. The process of claim 1 wherein said inorganic residue is cooled and comminuted prior to being reacted with the carbon dioxide-containing gas.

7. The process of claim 1 wherein said carbon dioxide-containing gas contains at least 15% $CO_2$ by volume.

8. The process of claim 1 wherein said residue is reacted with said carbon dioxide-containing gas at a temperature in excess of 700° F.

9. The process of claim 1 wherein said residue is reacted with said carbon dioxide-containing gas at a temperature between about 1100° F. and 1530° F.

10. A continuous cyclic process for the recovery of chemicals from sulfite spent liquor obtained from the digestion of a lignocellulosic plant material with a cooking liquor containing a sodium salt selected from the group consisting of sulfites and bisulfites which comprises the steps of: (1) separating said spent liquor from the pulp produced, (2) concentrating said spent liquor, (3) incinerating the concentrated liquor to release volatile products therefrom and to produce a molten inorganic residue, (4) cooling said residue to a solid form, (5) reacting the solidified residue with hot $CO_2$-containing gas in a desulfurizing zone at an elevated temperature to release a gaseous mixture containing vaporized elemental sulfur and to produce a solid residue of sodium carbonate, (6) mixing said carbonate with water to form a carbonate solution, (7) cooling said gaseous mixture to condense the elemental sulfur, (8) separating the condensed sulfur from the non-condensible gases, (9) burning the resulting elemental sulfur in the presence of a free oxygen-containing gas to form sulfur dioxide, and (10) mixing the sulfur dioxide with said carbonate solution to produce fresh sulfite cooking liquor for reuse in the pulping process.

11. The process of claim 10 including the steps of cooling said volatile products, mixing said products with a portion of said carbonate solution whereby $SO_2$ is absorbed therein while the remaining portion of said volatile products is released, and utilizing the resulting liquor in the preparation of fresh cooking liquor.

12. The process of claim 10 wherein the reaction in said desulfurizing zone is effectuated at a temperature in excess of 700° F.

13. The process of claim 10 wherein the reaction in said desulfurizing zone is effectuated at a temperature between about 1100° F. and 1530° F.

14. The process of claim 10 wherein the $CO_2$-containing gas contains at least 15% $CO_2$ by volume.

15. The process of claim 10 wherein said solidified inorganic residue is comminuted prior to being reacted in the desulfurizing zone.

References Cited in the file of this patent

UNITED STATES PATENTS

| | | |
|---|---|---|
| 1,469,960 | Richter et al. | Oct. 9, 1923 |
| 1,483,160 | Creighton | Feb. 12, 1924 |
| 1,728,252 | Rawling | Sept. 17, 1929 |
| 1,997,773 | Haglund | Apr. 16, 1935 |
| 2,824,071 | Gray | Feb. 18, 1958 |